United States Patent
Norimoto

(10) Patent No.: US 6,820,001 B2
(45) Date of Patent: Nov. 16, 2004

(54) NAVIGATION SYSTEM FOR VEHICLE

(75) Inventor: Masatsugu Norimoto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/988,318

(22) Filed: Nov. 19, 2001

(65) Prior Publication Data

US 2002/0147545 A1 Oct. 10, 2002

(30) Foreign Application Priority Data

Apr. 6, 2001 (JP) .................................... 2001-109033

(51) Int. Cl.[7] ............................................ G06F 7/00
(52) U.S. Cl. .................. 701/201; 701/211; 340/990; 707/1; 707/102
(58) Field of Search ...................... 701/211, 200–210, 701/212, 213; 340/990, 995, 323 R, 988; 707/1, 102, 3, 4, 101

(56) References Cited

FOREIGN PATENT DOCUMENTS

JP         9-96532      4/1997

Primary Examiner—Thomas G. Black
Assistant Examiner—Ronnie Mancho
(74) Attorney, Agent, or Firm—Birch, Stewart, Kolasch & Birch, LLP

(57) ABSTRACT

A map area indicated by map data is partitioned into a plurality of map units respectively having a squared area, and a route from a current position of a vehicle to a destination is determined according to the map data read from a map recording medium mounted on a disk unit. The route is partitioned into a plurality of route links respectively included in one map unit. In cases where each route link is placed in a general road section, a first route link map unit including the route link and eight map units adjacent to the first route link map unit are specified. Also, in cases where each route link is placed in a throughway section, only a second route link map unit including the route link is specified. Map data of each first route link map unit, map data of the eight map units adjacent to the first route link map units and map data of the second route link map units are stored in a data buffer in a pre-reading process, and a navigation function is performed according to the map data of the data buffer. Therefore, because a volume of the map data stored in the data buffer is reduced, an additional function other than the navigation function performable by using the disk unit can be sufficiently performed.

12 Claims, 7 Drawing Sheets

NAVIGATION SYSTEM FOR VEHICLE

BACKGROUND OF THE INVENTION

1. Field of the Invention

The present invention relates to a navigation system for vehicle in which a current position of a vehicle is detected, map data of a specific area including the current position is read out from a recording medium, and a route from the current position to a received destination is determined according to the map data to guide the vehicle to take the route to the destination along the route by using picture and voice.

2. Description of Related Art

In a conventional navigation device for vehicle, a current position of a vehicle is detected by using a global positioning system (GPS), road map data and information relating to a road map are read out from a recording medium (for example, a compact disk) mounted on a disk unit, a route from the current position to a destination input by a user is determined according to a Dijkstra method, and the vehicle is guided to take the determined route to the destination by using picture and voice.

In this case, the road map data and the information relating to a road map are in advance read out from the recording medium to a memory of a data buffer. Therefore, the user can gain access to the road map data and the information stored in the data buffer memory at high speed.

The road map data and the information are successively read out while performing the navigation operation during the movement of the vehicle. Therefore, the road map data and the information can be read out without delay. However, the user sometimes requires that the navigation device for vehicle has a function other than the navigation function. In this case, it is required that the disk unit of the navigation device can be used to read out not only the road map data recording in a map recording medium but also another type of data recorded in another recording medium. Therefore, in recent years, as is described in Published Unexamined Japanese Patent Application No. H9-96532 of 1997, a prereading process is performed prior to the performance of the navigation to set the disk unit to a standby condition after the pre-reading process. Therefore, even though the navigation function is performed by the conventional navigation device for vehicle after the pre-reading process, a function other than the navigation function can be performed by using the disk unit during the navigation.

FIG. 6 schematically shows a plurality of map units of a map area to explain a pre-reading process in which map data of map units placed around a route is in advance read out prior to the navigation in the conventional navigation device for vehicle.

As shown in FIG. 6, a map area indicated by map data is partitioned into a plurality of map units. Each map unit has a squared area which is 1 km by 1 km. Also, each of all roads (not shown) of the map area indicated by the map data is divided into a plurality of links, and a route from a current position to a destination is placed on a road or a plurality of roads. Therefore, the route is composed of a plurality of links (hereinafter, called route links) corresponding to a plurality of parts of the route.

Each map unit including at least one route link is indicated by a densely hatched squared area and is called a route link map unit. Each map unit adjacent to one route link map unit is indicated by a sparsely hatched squared area and is called an adjacent map unit. Also, the other map units are respectively indicated by a non-hatched squared area. A pre-reading process is performed for the route link map units and the adjacent map units. That is, when a route from a current position to a destination is determined by a route determining unit according to map data, map data corresponding to both route link map units and adjacent map units is read out as map data relating to the route from a recording medium and is stored in a memory of a data buffer. Therefore, the user can gain access to the map data relating to the route stored in the memory of the data buffer at high speed. In contrast, no data of map units other than the route link map units and the adjacent map units is stored in the memory of the data buffer.

The route links of the route are identified by a plurality of identification names (that is, L1, L2, L3, - - - ) expressed by consecutive numbers. Because map data indicates two-dimensional area, each map unit is identified by an identification number M(i,j). Each route link is included in one route link map unit, and no route link is included in a plurality of map units. Therefore, only one route link map unit M(i,j) including an arbitrary route link Lk exists. Also, one route link map unit can include a plurality of route links. Therefore, one route link map unit can include all the route.

For example, three route links L1, L2 and L3 are included in the route link map unit placed on the most left side of the route.

FIG. 7 is a flow chart showing the procedure of the pre-reading process performed for the map data prior to the navigation performed in the conventional navigation device for vehicle. The procedure of the pre-reading process will be described below with reference to FIG. 6 and FIG. 7.

In a step ST11, to initially perform the pre-reading process for the route link L0, k=0 is set. In a step ST12, map data of a route link map unit M(i,j) including a route link Lk and map data of eight adjacent link map units M(i−1,j−1), M(i,j−1), M(i−1,j), M(i−1,j+1), M(i+1,j), M(i,j+1), M(i+1,j−1) and M(i+1,j+1) adjacent to the route link map unit M(i,j) are read out from a recording medium and are stored in a memory of a data buffer.

In a step ST13, it is checked whether or not the route link Lk is a final part of the route. In other words, it is checked whether or not the pre-reading process for the route from the current position to the destination is completed. In cases where the route link Lk is a final part of the route, the procedure proceeds to a step ST14, and the pre-reading process is completed.

In contrast, in cases where the route link Lk is not a final part of the route, the number k is incremented. That is, k=k+1 is set. Thereafter, the steps ST12 and ST13 are again performed.

As is described above, to make preparations for the use of a function other than the navigation function in the conventional navigation device for vehicle, it is required that the disk unit is set to a standby condition. Therefore, the disk unit is in advance used for the pre-reading process to transfer map data of the route link map units and map data of the adjacent map units from a recording medium to a memory of a data buffer, and the user can gain access to the map data of the route link map units and the map data of the adjacent map units stored in the memory of the data buffer at high speed.

However, in cases where a length of a route from a current position of a vehicle to a destination is extremely long, because a storage capacity of the data buffer is limited, it is impossible to write road map data of all route link map units and all adjacent map units relating to the extremely long route in the data buffer. Therefore, only a part of the road map data is written in the data buffer, but the other parts of the road map data cannot be written in the data buffer. In this case, each time the part of the road map data written in the data buffer is used for the navigation function, it is required that another part of the road map data is written in the data buffer. In this case, to write another part of the road map data in the data buffer, it is required that a recording medium of the road map data is again mounted on the disk unit. Also, it is sometimes required that another recording medium used for a function other than the navigation function is demounted from the disk unit to mount the recording medium of the road map data on the disk unit.

Also, because it is required that the recording medium of road map data and the recording medium used for a function other than the navigation function are alternately selected and mounted on the disk unit, it is troublesome for a driver when the driver drives the vehicle. Also, when the changeover of one recording medium to another one is performed, the performance of a function other than the navigation function is interrupted. Therefore, a problem has arisen that the user cannot sufficiently use a function other than the navigation function.

SUMMARY OF THE INVENTION

A main object of the present invention is to provide, with due consideration to the drawbacks of the conventional navigation device for vehicle, a navigation device for vehicle in which an additional function performable by using a map data providing unit is sufficiently performed in addition to a navigation function.

Also, a subordinate object of the present invention is to provide a navigation device for vehicle in which a user easily uses an additional function performable by using a map data providing unit without troublesomeness.

The main object and the subordinate object are achieved by the provision of a navigation device for vehicle comprising map data providing means for reading map data from a recording medium, pre-reading process means for receiving a destination, detecting a current position of a vehicle, determining a route from the current position of the vehicle to the destination according to the map data provided from the map data providing means, setting an area of a first map corresponding to a first part of the route placed in a first type of road to a first range in a pre-reading process and setting an area of a map corresponding to a second part of the route placed in a second type of road to a second range in the pre-reading process on condition that the second range of the area of the second map is narrower than the first range of the area of the second map, data storing means for storing both first map data, which corresponds to the first map area set by the pre-reading process means and is provided from the map data providing means, and second map data, which corresponds to the second map area set by the pre-reading process means and is provided from the map data providing means, in the pre-reading process, and guiding means for guiding the vehicle to take the route to the destination according to both the first map and the second map which are indicated by both the first map data and the second map data stored in the data storing means.

Therefore, a data volume of the map data stored in the data storing means can be considerably reduced.

Accordingly, even though the length of the route is long, the map data relating to the route can be stored in advance in the data storing means according to the pre-reading process. Also, because a time required to store the map data relating to the route in the data storing means can be shortened, an additional function other than the navigation function can be sufficiently performed by using the map data providing means. Also, the requirement of the additional storage of the map data relating to the route in the data storing means is reduced. Therefore, the number of mounting operations of the map recording medium on the map data providing means can be reduced. Accordingly, a user can easily use an additional function other than the navigation function by using the map data providing means without troublesomeness.

It is preferred that the pre-reading process means comprises road attribute checking means for receiving the map data of a map area, which is partitioned into a plurality of map units and includes both the first type of road, to which a road attribute indicating the first type of road is attached, and the second type of road to which a road attribute indicating the second type of road is attached, from the map data providing means, partitioning the route placed on both the first type of road and the second type of road into a plurality of route links respectively included in one of the map units so as to attach the road attribute indicating the first type of road or the road attribute indicating the second type of road to each route link, checking whether the road attribute attached to each route link indicates the first type of road or the second type of road, specifying a first remarked map unit including each first remarked route link and one or a plurality of map units placed near to the first remarked map unit in cases where the road attribute attached to the first remarked route link indicates the first type of road, specifying a second remarked map unit including each second remarked route link in cases where the road attribute attached to the second remarked route link indicates the second type of road, controlling the data storing means to store data of the first remarked map units and data of the map units placed near to the first remarked map units as the first map data and controlling the data storing means to store data of the second remarked map units and data of the map units placed near to the second remarked map units as the second map data.

Therefore, a data volume of the map data stored in the data storing means can be reliably reduced. Accordingly, even though the length of the route is long, the map data relating to the route can be stored in advance in the data storing means according to the pre-reading process. Also, a time required to store the map data relating to the route in the data storing means can be shortened, and an additional function other than the navigation function can be sufficiently performed by using the map data providing means. Also, the requirement of the additional storage of the map data relating to the route in the data storing means is reduced, and the number of mounting operations of the map recording medium on the map data providing means can be reduced. Accordingly, a user can easily use an additional function other than the navigation function by using the map data providing means without troublesomeness.

It is preferred that the first type of road denotes a general road other than a throughway, and the second type of road denotes a throughway.

Because a user does not desire a map corresponding to an area adjacent to the throughway, data volume of the map data stored in the data storing means can be reasonably reduced.

It is preferred that one or a plurality of map units placed near to one second remarked map unit are specified by the road attribute checking means in cases where a junction exists in the second remarked map unit, and the data storing means is controlled by the road attribute checking means to additionally store data of the map units placed near to the second remarked map unit as the second map data.

Because there is high probability that the user changes his destination when the vehicle running on a throughway approaches a junction, map data of an area near to the junction is additionally stored in data storing means in the pre-reading process. Therefore, the navigation function can be performed according to the map of the area around the junction. Accordingly, the user can reliably recognize the existence of the junction on the map.

Also, because the user can reliably recognize the existence of the junction on the map, the user can keep on the route without taking a wrong road at the junction. Also, even though the user takes a wrong road differing from a correct route at the junction, because the navigation function is performed according to the map of the area around the junction, a probability of the returning of the user to the correct route can be heightened without again mounting a map recording medium on the map data providing means.

It is preferred that a second pre-reading process is performed by the road attribute checking means to specify one or a plurality of additional map units placed near to the map units which are placed near to the first remarked map unit or the second remarked map unit, and the data storing means is controlled by the road attribute checking means to additionally store data of the additional map units.

In cases where there is a free space in the data storing means after the completion of the pre-reading process, the second pre-reading process is performed.

Accordingly, even though the user takes a wrong road differing from a correct route, a probability of the returning of the user to the correct route can be heightened without again mounting the map recording medium on the map data providing means. Also, even though a function other than the navigation function is not used in the navigation device for vehicle, resources of the map data providing means and the data storing means can be effectively used.

It is preferred that the map data providing means is formed of a communication unit, connected with an internet, for downloading the map data from an external server and providing the map data for the pre-reading process means and the data storing means.

Therefore, updated map data can be always used in the navigation device for vehicle without increasing the storage capacity of the data storing means.

DETAILED DESCRIPTION OF THE PREFERRED EMBODIMENTS

Embodiments of the present invention will now be described with reference to the accompanying drawings.
Embodiment 1

Figure 1:
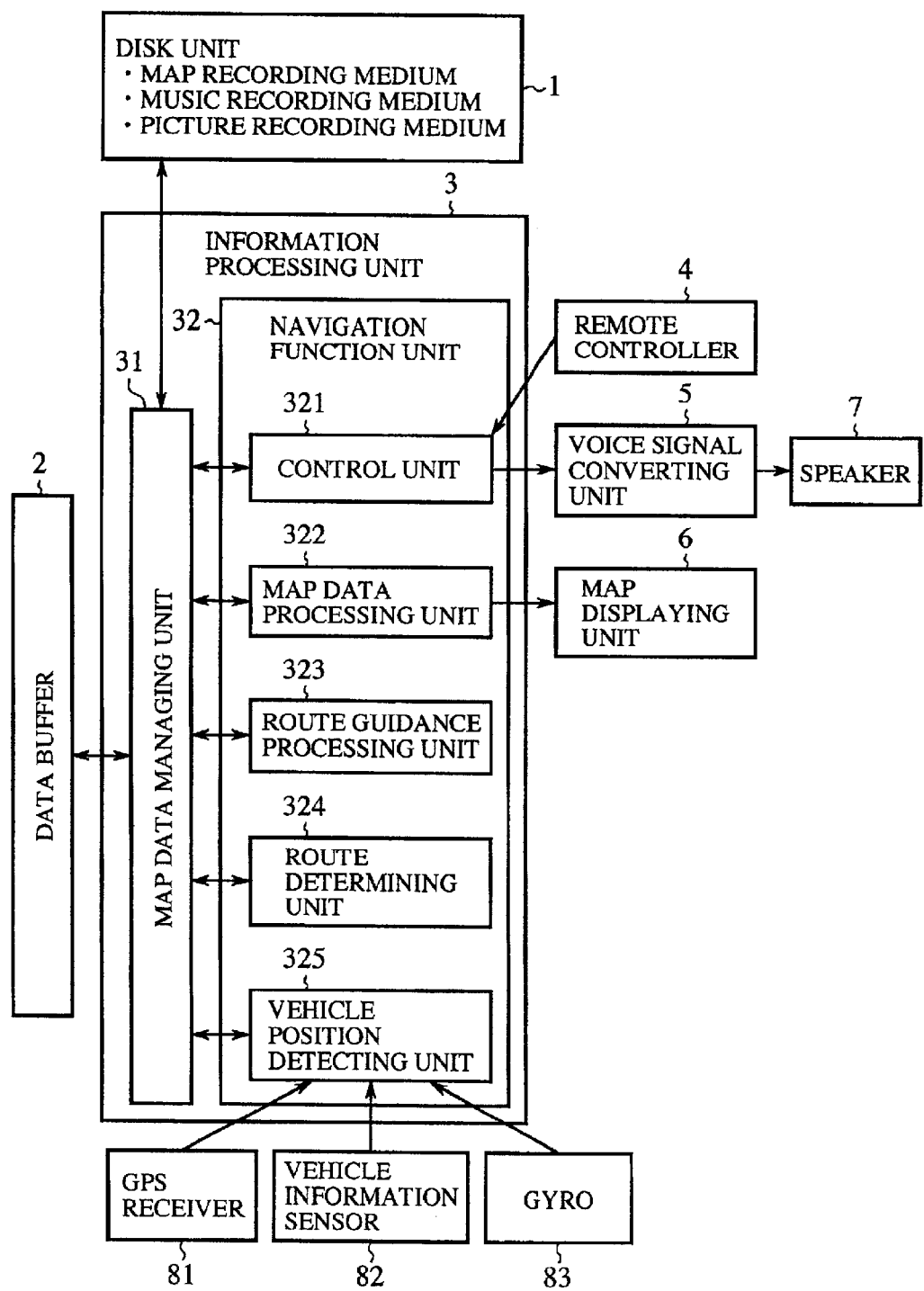
FIG. 1 is a block diagram showing the configuration of a navigation device for vehicle according to a first embodiment of the present invention.

FIG. 1 is a block diagram showing the configuration of a navigation device for vehicle according to a first embodiment of the present invention.

In FIG. 1, 1 indicates a disk unit (or map data providing means) on which one of various types of recording mediums is mounted. For example, a user has a map recording medium of map data, a music recording medium of music data and a picture recording medium of picture data, and one of the recording mediums is mounted on the disk unit 1. 2 indicates a data buffer (or data storing means). The user can gain access to data stored in the data buffer 2 at high speed. 3 indicates information processing unit (or pre-reading process means) for performing information processing such as a pre-reading process required in advance to perform a navigation function. 4 indicates a remote controller from which a user's instruction is input to the information processing unit 3. 5 indicates a voice signal converting unit (or guiding means) for converting a digital voice guidance signal to an analog voice guidance signal. 6 indicates a map displaying unit (or guiding means) for displaying a route map including a route. 7 indicates a speaker (or guiding means) for outputting voice according to the analog voice guidance signal of the voice signal converting unit 5. 31 indicates a map data managing unit for managing the reception of map data from the disk unit 1. 32 indicates a navigation function unit for selecting map data indicating the route map from the map data sent from the disk unit 1. 81 indicates a GPS receiver for receiving GPS information. 82 indicates a vehicle information sensor for detecting vehicle information such as states (for example, a travel speed) of a vehicle and a travel distance of the vehicle. 83 indicates a gyro for recognizing a travel direction of the vehicle. 321 indicates a control unit (or road attribute checking means) for controlling all elements of this navigation device for vehicle according to a control algorithm of the pre-reading process. 322 indicates a map data processing unit for superposing route data on map data. 323 indicates a route guidance processing unit for preparing route guidance information. 324 indicates a route determining unit for determining a route from a current position of the vehicle to a specified destination. 325 indicates a vehicle position detecting unit for detecting a position of the vehicle according to the GPS information of the GPS receiver 81, the vehicle information of the vehicle information sensor 82 and the travel direction of the vehicle of the gyro 83.

Next, the whole operation of the navigation device for vehicle will be described below.

A user inputs request items such as a destination of a vehicle to the navigation device by using the remote controller 4. Also, the user mounts a map recording medium on the disk unit 1 to read out map data of a map area including the destination and a current position from the map recording medium, send map data of a map area around the route to the data buffer 2 through the map data managing unit 31 and store the map data in the data buffer 2 according to a pre-reading process. Thereafter, the user demounts the map recording medium from the disk unit 1, and the user mounts a music recording medium on the disk unit 1 to read out music data from the music recording medium and store the music data in a music memory (not shown). Also, in another case, the user demounts the map recording medium from the disk unit 1, and the user mounts a picture recording medium on the disk unit 1 to read out picture data from the picture recording medium and store the picture data in a picture memory (not shown). Thereafter, an additional function using the music data or the picture data is performed while the navigation function is performed by using the navigation device for vehicle.

In detail, GPS information sent from a GPS satellite is received in the GPS receiver 81, a travel speed of the vehicle and a travel distance of the vehicle are detected in the vehicle information sensor 82, and a travel direction of the vehicle is recognized in the gyro 83. The GPS information and information of the travel speed, the travel distance and the travel direction of the vehicle are sent to the vehicle position detecting unit 325.

In cases where a navigation function is performed, a pre-reading process is initially performed when a destination is input to the remote control 4. That is, information of the destination is received in the route determining unit 324 through the control unit 321, and the current position of the vehicle detected in the vehicle position detecting unit 325 is received in the route determining unit 324 under the control of the control unit 321. Thereafter, in response to a request of the map data managing unit 31, map data relating to a map area including the current position and the destination is read out in advance from the map recording medium to the route determining unit 324, and a route from the current position to the destination is determined on a road map indicated by the map data. Thereafter, map data relating to the route from the current position to the destination is specified and stored in advance in a memory of the data buffer 2 through the map data managing unit 31. This map data relating to the route specified in the pre-reading process is described later in detail.

Thereafter, the map data relating to the route is read out from the memory of the data buffer 2 to the map data processing unit 322 and the route guidance processing unit 323. Here, when no map data is stored in the data buffer 2, it is possible that the map data managing unit 31 directly receives the map data relating to the route from the map recording medium mounted on the disk unit 1 and sends the map data to the map data processing unit 322 and the route guidance processing unit 323.

Thereafter, in the map data processing unit 322, route data indicating the route from the current position to the destination is received from the route determining unit 324 and is superposed on the map data relating to the route under the control of the control unit 321. Thereafter, the map data with the route data is sent to the map displaying unit 6, and a route map including the route is displayed according to the map data with the route data.

Also, in the route guidance processing unit 323, route guidance information indicating guidance of the route from the current position to the destination is prepared according to the map data relating to the route, and the route guidance information is sent to the control unit 321.

In the control unit 321, a voice guidance signal (in general, a digital voice guidance signal) corresponding to the route guidance information is prepared, and the voice guidance signal is sent to the voice signal converting unit 5.

In the voice signal converting unit 5, the digital voice guidance signal is converted to an analog voice guidance signal having an audio frequency, and the analog voice guidance signal is sent to the speaker 7. In the speaker 7, voice indicating a route guidance is output according to the analog voice guidance signal.

Therefore, the user can listen to the route guidance while watching the route map including the route.

Next, the pre-processing process will be described in detail.

Figure 2:
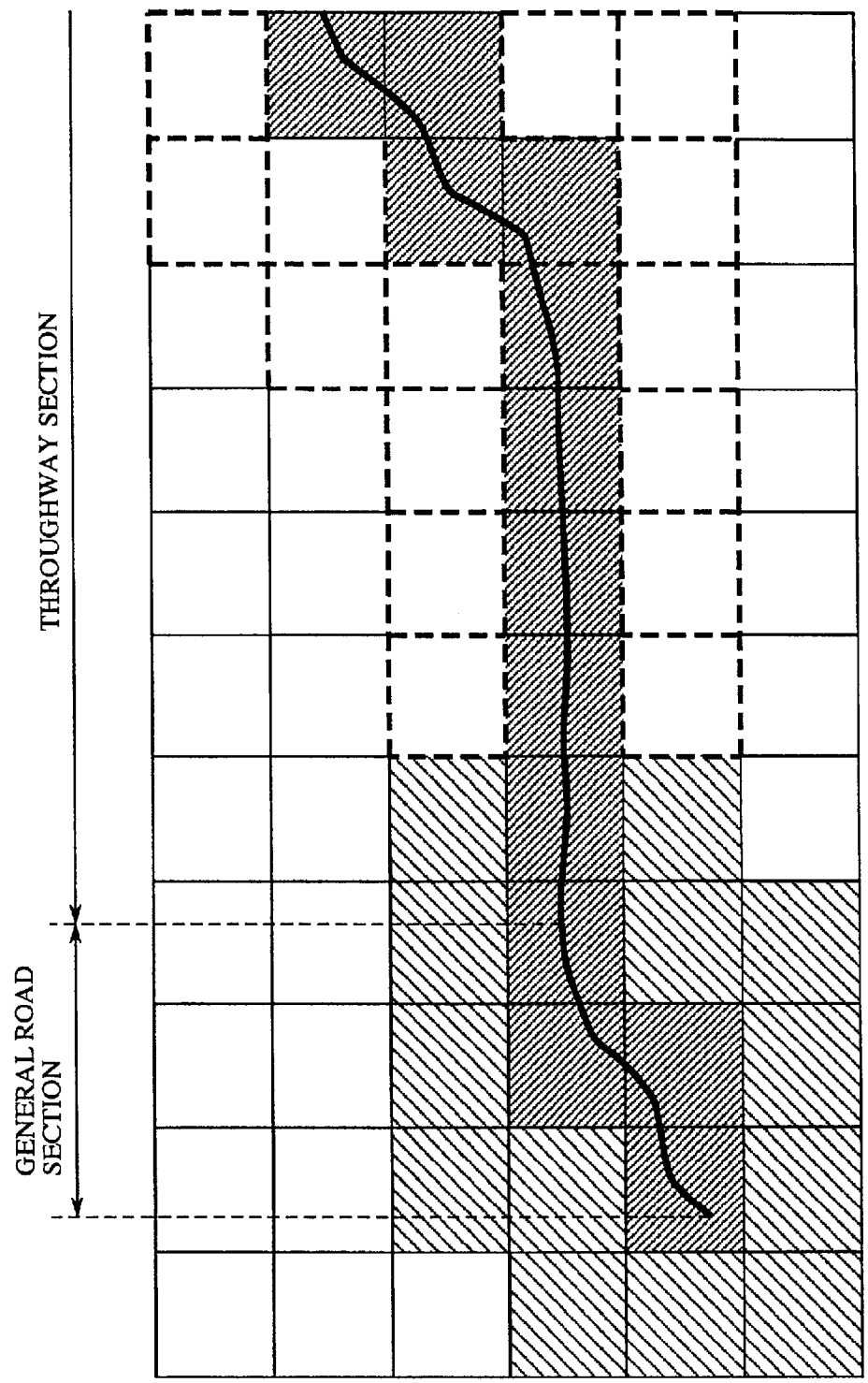
FIG. 2 is an explanatory view schematically showing a plurality of map units around a route specified in a pre-reading process according to the first embodiment.

FIG. 2 is an explanatory view schematically showing a plurality of map units around a route specified in the pre-processing process according to the first embodiment.

Figure 6:
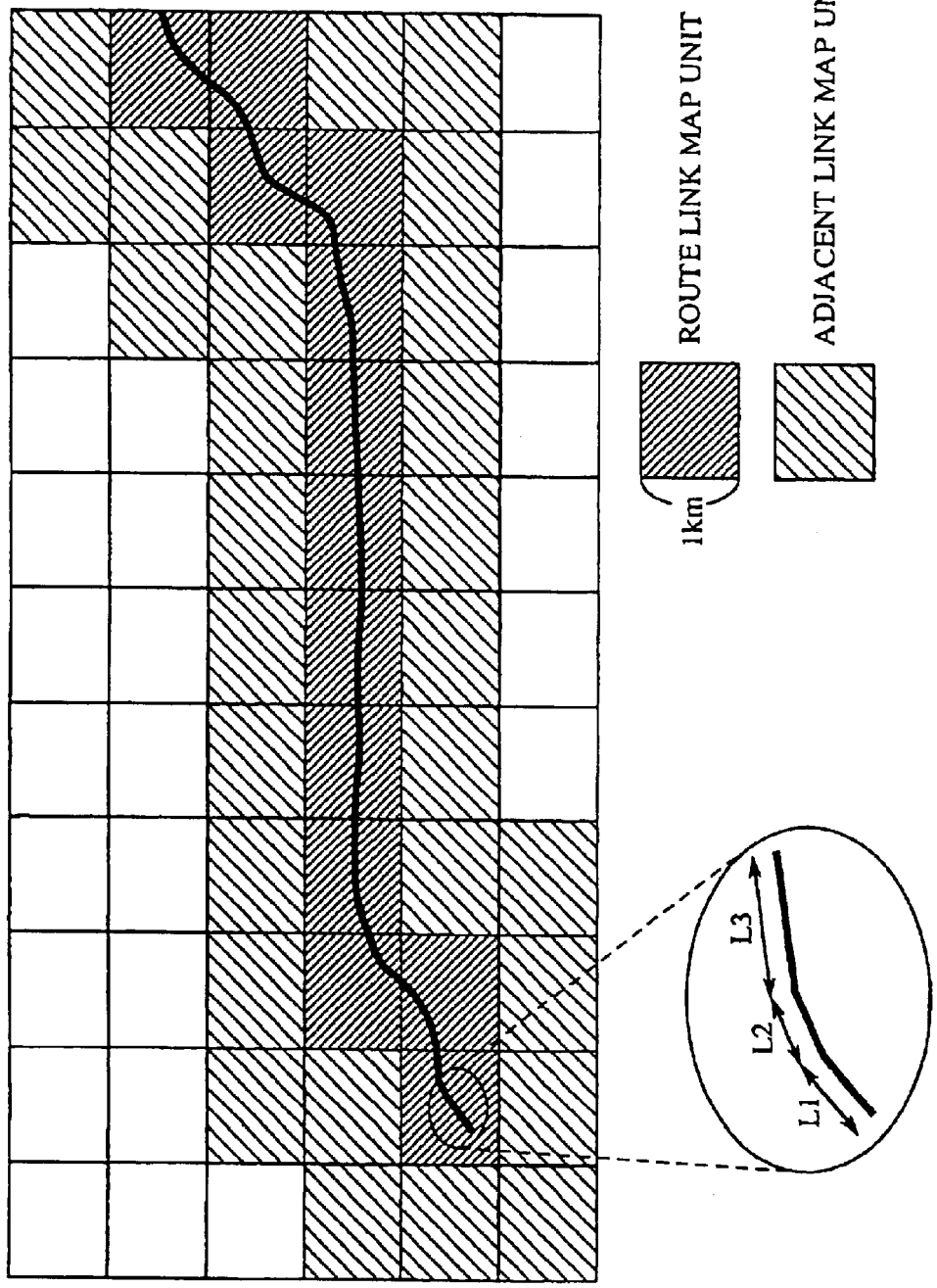
FIG. 6 is an explanatory view schematically showing a plurality of map units around a route specified in a pre-reading process prior to the navigation in a conventional navigation device for vehicle.
Figure 7:
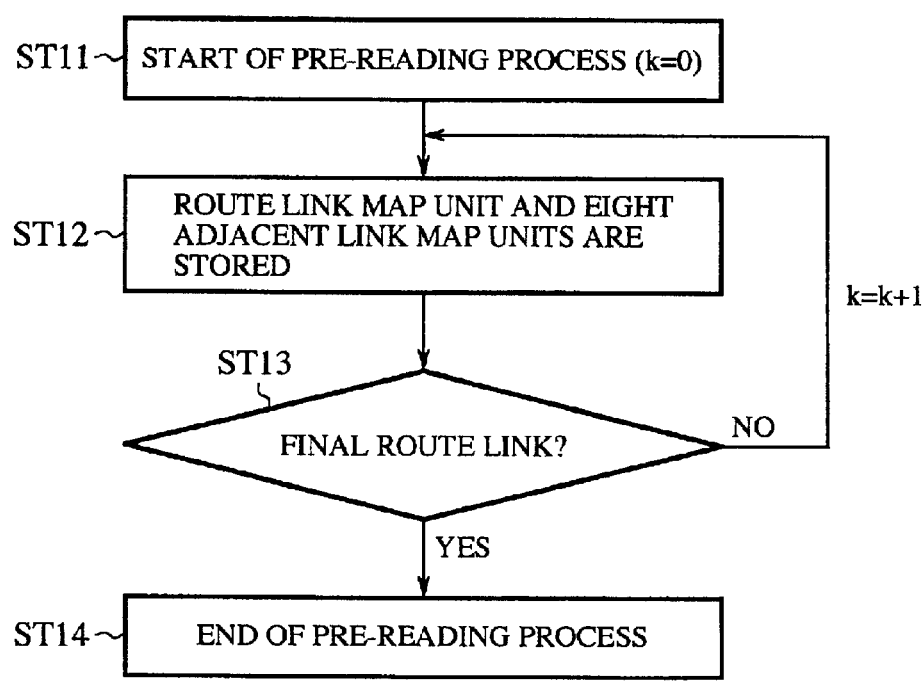
FIG. 7 is a flow chart showing the procedure of a pre-reading process performed for map data prior to the navigation in a conventional navigation device for vehicle.

In FIG. 2, three types of map units are shown in the same manner as those shown in FIG. 6. That is, each route link map unit indicated by a densely hatched squared area includes one route link or more of the route, and each adjacent map unit indicated by a sparsely hatched squared area is adjacent to one route link map unit. The route link map units and the adjacent map units are specified, and map data of the route link map units and map data of the adjacent map units are stored in the memory of the data buffer 2. Map data corresponding to the other map units respectively indicated by a non-hatched squared area is not stored in the memory of the data buffer 2.

In this embodiment, all roads of a map area indicated by the map data of the map recording medium are classified into a type of general road (or a first type of road) and a type of throughway (or a second type of road). To identify roads belonging to each type of road, a road attribute indicating a type of general road is attached to data of each general road, and a road attribute indicating a type of throughway is attached to data of each throughway. The map data recorded in the map recording medium includes the data of the roads to which the road attribute is attached. Therefore, a road attribute indicating a type of general road is attached to each route link denoting a part of route placed on a general road, and a road attribute indicating a type of throughway is attached to each route link denoting a part of route placed on a throughway.

As shown in FIG. 2, the current position is placed on a general road, and there is a throughway on a route from the current position to the destination. Therefore, the map area along the route is partitioned into a general road section and a throughway section, a road attribute indicating a type of general road is attached to each route link Lk (k=0, 1, 2, - - - ) placed in the general road section, and a road attribute indicating a type of throughway is attached to each route link Lk placed in the throughway section.

Figure 3:
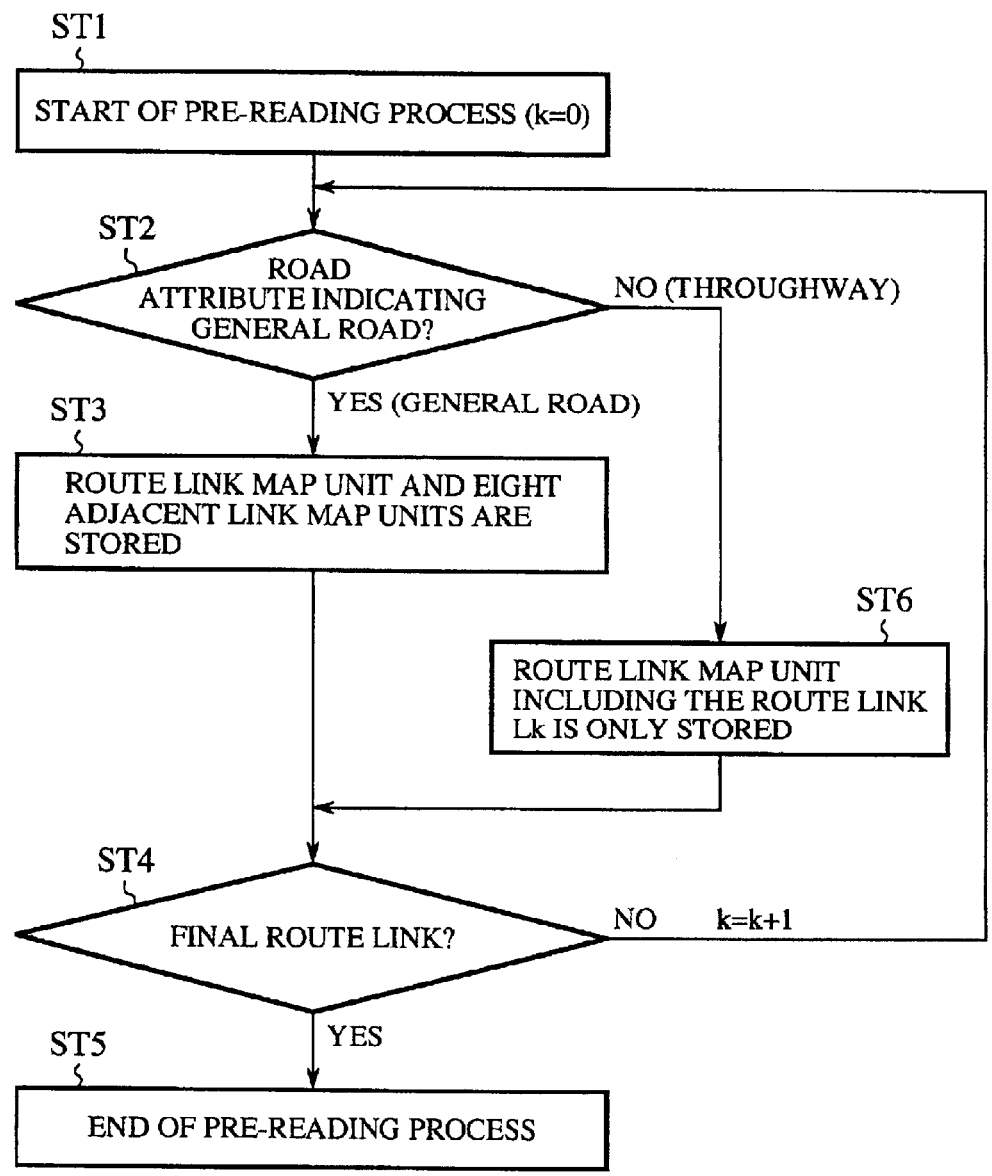
FIG. 3 is a flow chart showing the procedure of a pre-reading process performed in the navigation device for vehicle according to the first embodiment.

FIG. 3 is a flow chart showing the procedure of the pre-reading process performed under the control of the control unit 321 in the navigation device for vehicle according to the first embodiment.

In a step ST1, to initially perform the pre-reading process for the route link L0, k=0 is set. In a step ST2, it is judged whether or not a road attribute attached to the route link Lk is a type of general road. In cases where the road attribute attached to the route link Lk is a type of general road, the procedure proceeds to a step ST3.

In the step ST3, a route link map unit M(i,j) including the route link Lk and eight adjacent link map units M(i−1,j−1), M(i,j−1), M(i−1,j), M(i−1,j+1), M(i+1,j), M(i,j+1), M(i+1,j−1 and M(i+1,j+1) adjacent to the route link map unit M(i,j) are specified, and map data of the route link map unit and map data of the eight adjacent link map units are stored in the memory of the data buffer 2. Thereafter, the procedure proceeds to a step ST4.

Also, in cases where the road attribute attached to the route link Lk is not a type of general way, the road attribute attached to the route link Lk is a type of throughway. In this case, the procedure proceeds to a step ST6. In the step ST6, because the user does not require a map corresponding to an area adjacent to the throughway, a route link map unit M(i,j) including the route link Lk is only specified, and map data of the route link map unit is stored in the memory of the data buffer 2. Thereafter, the procedure proceeds to the step ST4.

In the step ST4, it is checked whether or not the route link Lk is a final part of the route. In other words, it is checked whether or not the pre-reading process for the route from the current position to the destination is completed. In cases where the route link Lk is a final part of the route, the procedure proceeds to a step ST5, and the pre-reading process is completed.

In contrast, in cases where the route link Lk is not a final part of the route, the number k is incremented. That is, k=k+1 is set. Thereafter, the step ST2 is again performed.

As is described above, in the first embodiment, a road attribute indicating a general road or a throughway is attached to each route link Lk (k=0, 1, 2, - - - ) of the route to classify the route links into a general road section and a throughway section, map data of a route link map unit M(i,j) including each route link Lk and map data of eight adjacent link map units adjacent to the route link map unit M(i,j) are stored in the memory of the data buffer 2 in cases where the route link Lk is placed in the general road section, and map data of a route link map unit M(i,j) including each route link Lk is only stored in the memory of the data buffer 2 in cases where the route link Lk is placed in the throughway section. That is, a range of a map area for the route link Lk of the throughway section is narrower than a range of a map area for the route link Lk of the general road section. Therefore, a data volume of the map data stored in the memory of the data buffer 2 can be considerably reduced. Accordingly, even though the length of the route is long, the map data relating to the route can be stored in advance in the memory of the data buffer 2 according to the pre-reading process.

Also, in the first embodiment, because a data volume of the map data stored in the memory of the data buffer 2 is considerably reduced as compared with that in the conventional navigation device for vehicle, a time required to store the map data relating to the route in the memory of the data buffer 2 can be shortened. Accordingly, because a time period, in which the disk unit 1 is set to a standby condition, is lengthened, an additional function other than the navigation function can be sufficiently performed by using the disk unit 1.

Also, in the first embodiment, because a data volume of the map data stored in the memory of the data buffer 2 is considerably reduced, the requirement of the additional storage of the map data relating to the route in the memory of the data buffer 2 is reduced. Therefore, the number of mounting operations of the map recording medium on the disk unit 1 can be reduced. Accordingly, the user can easily use an additional function other than the navigation function by using the disk unit 1 without troublesomeness.

In the first embodiment, in case of the general road, map data of eight adjacent link map units M(i−1,j−1), M(i,j−1), m(i−1, 1j), M(i−1,j+1), M(i+1, j), M(i,j+1), M(i+1,j−1) and M(i+1,j+1) adjacent to each route link map unit M(i,j) is stored in the memory of the data buffer 2 in the pre-reading process in addition to map data of the route link map unit M(i,j). However, the first embodiment is not limited to the eight adjacent link map units. That is applicable that the number of map units placed near to each route link map unit M(i,j) be arbitrarily increased to store map data of the map units in addition to map data of the route link map unit.

Embodiment 2

The configuration of a navigation device for vehicle according to a second embodiment is the same as that of the first embodiment, but a control algorithm of the pre-reading process stored in the control unit 321 differs from that in the first embodiment.

Figure 4:
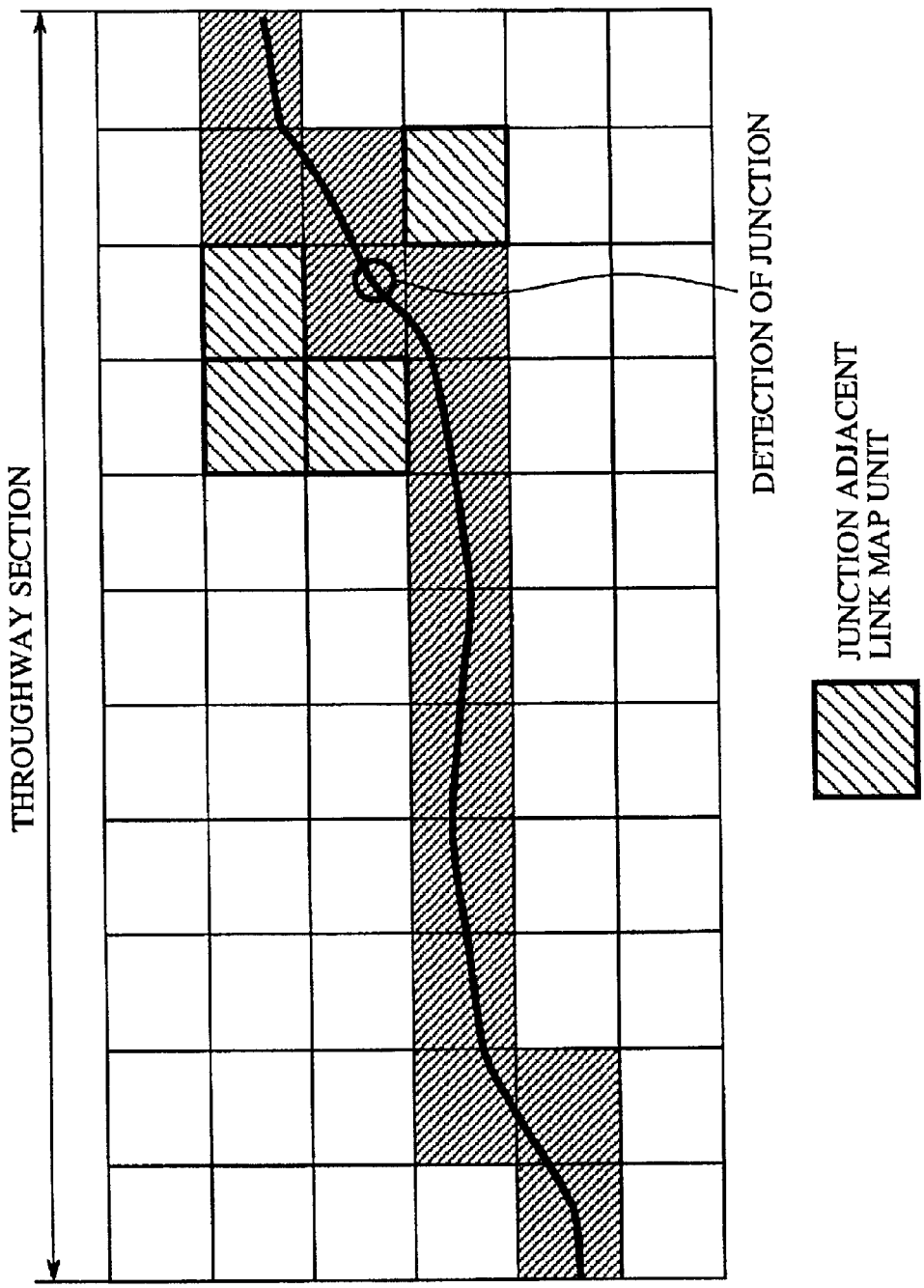
FIG. 4 is an explanatory view schematically showing a plurality of map units around a route specified in a pre-reading process according to a second embodiment.

FIG. 4 is an explanatory view schematically showing a plurality of map units around a route specified in the pre-processing process according to the second embodiment.

In FIG. 4, a type of route link map units, a type of adjacent map units and a type of the other map units are shown in the same manner as those shown in FIG. 2. A road attribute indicating a throughway is attached to all route links Lk shown in FIG. 4. In cases where no junction is detected in a route link map unit including a route link Lk, the route link map unit M(i,j) including the route link Lk is only specified, and map data of the route link map unit M(i,j) is stored in the memory of the data buffer 2 in the same manner as in the first embodiment. In contrast, in cases where a junction is detected in a route link map unit including a route link Lk, because a map of an area adjacent to the junction is useful for the user, the route link map unit M(i,j) including the route link Lk and eight junction adjacent link map units M(i−1, j−1), M(i,j−1), M(i−1,j), M(i−1,j+1), M(i+1,j), M(i,j+1), M(i+1,j−1) and M(i+1,j+1) adjacent to the route link map unit M(i,j) are specified, and map data of the route link map unit M(i,j) and map data of the eight junction adjacent link map units are stored in the memory of the data buffer 2 in the same manner as those in the general road attribute case of the first embodiment.

As is described above, in the second embodiment, because there is high probability that the user changes his destination when the vehicle running on a throughway approaches a junction, map data of an area near to the junction is additionally stored in the memory of the data buffer 2 in the pre-reading process. Therefore, a route map including the area around the junction can be displayed on the picture displaying unit 6, and the user can listen to the route guidance of the area around the junction while watching the map of the area around the junction. Accordingly, the user can reliably recognize the existence of the junction on the map.

Also, in the second embodiment, because the user can reliably recognize the existence of the junction on the map, the user can keep on the route without taking a wrong road at the junction. Also, even though the user takes a wrong road differing from a correct route at the junction, because the user can listen to the route guidance of the area around the junction while watching the map of the area around the junction, a probability of the returning of the user to the correct route can be heightened without again mounting the map recording medium on the disk unit 1.

In the second embodiment, in case of a junction, map data of eight junction adjacent link map units M(i−1,j−1), M(i, j−1), M(i−1,j), M(i−1,j+1), M(i+1,j), M(i,j+1), M(i+1,j−1) and M(i+1,j+1) adjacent to each route link map unit M(i,j) is stored in the memory of the data buffer 2 in the pre-reading process in addition to map data of the route link map unit M(i,j). However, the second embodiment is not limited to the eight junction adjacent link map units. That is, it is applicable that the number of map units near to each route link map unit M(i,j) be arbitrarily increased to store map data of the map units in addition to map data of the route link map unit.

Embodiment 3

The configuration of a navigation device for vehicle according to a third embodiment is the same as that of the first embodiment, but a control algorithm of the pre-reading process stored in the control unit 321 differs from that in the first embodiment.

Figure 5:
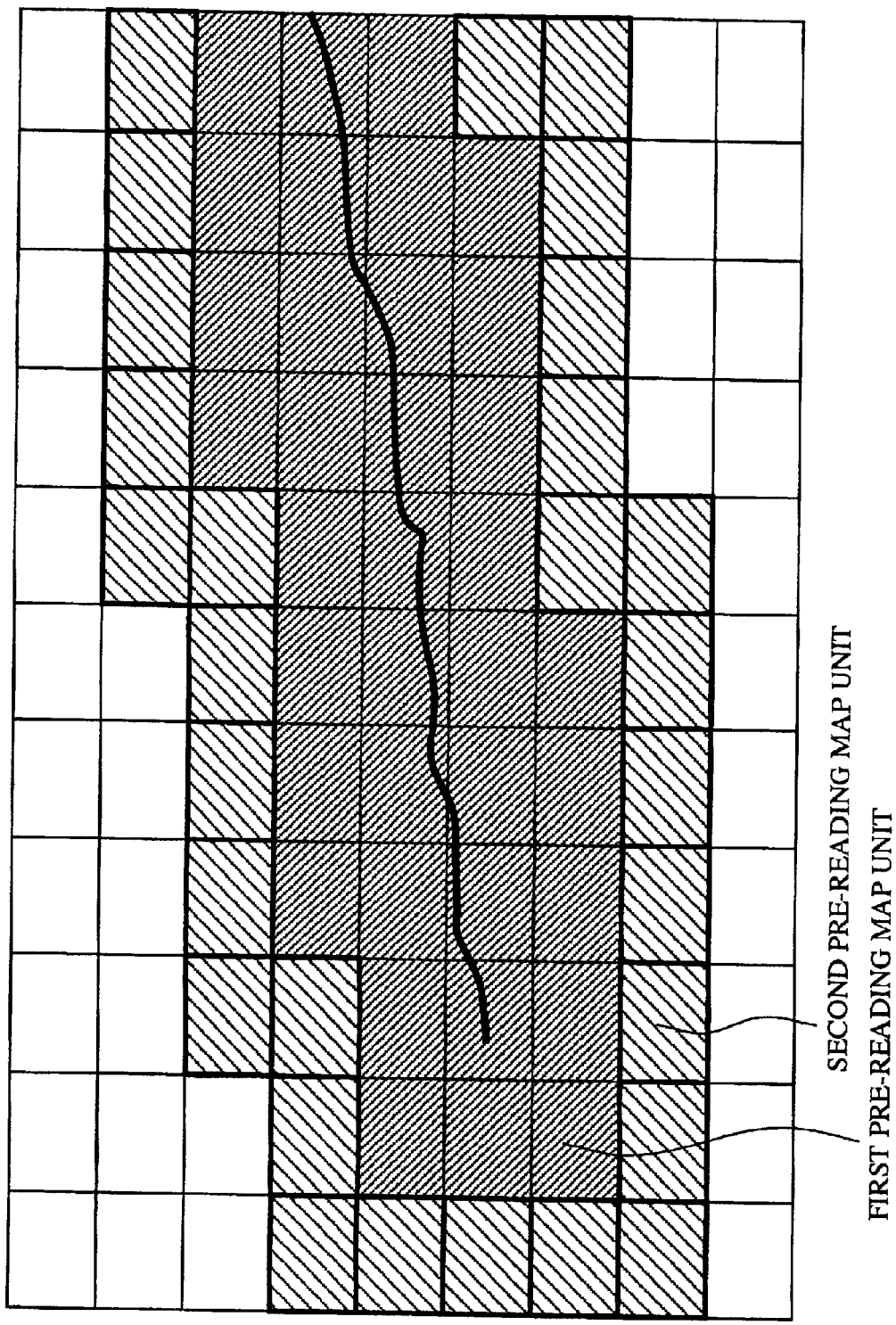
FIG. 5 is an explanatory view schematically showing a plurality of map units around a route specified in a pre-reading process according to a third embodiment.

FIG. 5 is an explanatory view schematically showing a plurality of map units around a route according to the third embodiment.

In a third embodiment, the pre-reading process is performed twice. That is, a plurality of first pre-reading map units respectively indicated by a densely hatched squared area are placed around the route and are specified, and map data of the first pre-reading map units is stored in the memory of the data buffer 2 according to a first pre-reading process. The first pre-reading map units agree with the group of the route link map units and the adjacent map units processed in the first embodiment. Also, a plurality of second pre-reading map units respectively indicated by a sparsely hatched squared area are placed in adjacent to the first pre-reading map units and are specified, and map data of the second pre-reading map units is stored in the memory of the data buffer 2 according to a second pre-reading process.

In cases where there is a free space in the memory of the data buffer 2 after the completion of the first pre-reading process, the second pre-reading process is performed to store the second pre-reading map units in the free space of the memory of the data buffer 2.

In the third embodiment, the first pre-reading map units agree with the group of the route link map units and the adjacent map units specified in the first embodiment. However, it is applicable that the first pre-reading map units agree with the group of the route link map units and the adjacent map units specified in the second embodiment.

Also, in the third embodiment, the map data of the second pre-reading map units adjacent to the first pre-reading map units is stored in the memory of the data buffer 2 in the second pre-reading process. However, the third embodiment is not limited to the map units adjacent to the first pre-reading map units. That is, in cases where a free space existing in the memory of the data buffer 2 after the completion of the first pre-reading process has a large storage capacity, it is applicable that the number of map units be increased to read out map data of the map units in the second pre-reading process. For example, it is applicable that map data of map units adjacent to the second pre-reading map units be additionally stored in the free space of the memory of the data buffer 2 in the second pre-reading process. Also, it is applicable that a manufacturer or a user of the navigation device for vehicle arbitrarily determine map data of map units stored in the memory of the data buffer 2 in the second pre-reading process.

As is described above, in the third embodiment, even though map data relating to a route is stored in the memory of the data buffer 2 in the first pre-reading process, in cases where the map recording medium is still mounted on the disk unit 1, the map data of the second pre-reading map units adjacent to the first pre-reading map units is stored in the memory of the data buffer 2 in the second pre-reading process. Accordingly, even though the user takes a wrong road differing from a correct route, because the user can listen to the route guidance while watching the map of the area around the junction, a probability of the returning of the user to the correct route can be heightened without again mounting the map recording medium on the disk unit 1.

Also, in the third embodiment, even though a function other than the navigation function is not used in the navigation device for vehicle, resources of the disk unit 1 and the data buffer 2 can be effectively used.

Also, in the first to third embodiments, the map recording medium is mounted on the disk unit 1. However, each embodiment is not limited to the disk unit 1. That is, it is applicable that a communication device connected with an internet system be used in place of the disk unit 1 to download map data provided by an external server to the communication device through the internet and to store the map data in the memory of the data buffer 2. In this case, updated map data can be always used in the navigation device for vehicle without increasing the storage capacity of the data buffer 2.

What is claimed is:

1. A navigation device for vehicle comprising:

map data providing means for reading map data from a recording medium;

pre-reading process means for receiving a destination, detecting a current position of a vehicle, determining a route from the current position of the vehicle to the destination according to the map data provided from the map data providing means, setting an area of a first map, which corresponds to a first part of the route associated with a first type of road, to a first range in a pre-reading process and setting an area of a second map, which corresponding to a second part of the route associated with a second type of road, to a second range in the pre-reading process such that map data size of the area of the second range is less than map data size of the area of the first range, such that the first type of road is indicated by a first road attribute and the second type of road is indicated by a second road attribute, wherein the first type of road differs from the second type of road according to the first road attribute and the second road attribute, and wherein the first type of road denotes a general road other than a throughway, and the second type of road denotes a throughway;

data storing means for storing both first map data, which corresponds to the first map area set by the pre-reading process means and is provided from the map data providing means, and second map data, which corresponds to the second map area set by the pre-reading process means and is provided from the map data providing means, in the pre-reading process; and guiding means for guiding the vehicle to take the route to the destination according to both the first map and the second map which are indicated by both the first map data and the second map data stored in the data storing means.

2. A navigation device for vehicle according to claim 1, wherein the pre-reading process means comprises:

road attribute checking means for:

receiving the map data of a map area, which is partitioned into a plurality of map units and includes both the first type of road, to which the first road attribute indicating the first type of road is attached, and the second type of road to which the second road attribute indicating the second type of road is attached, from the map data providing means, partitioning the route placed on both the first type of road and the second type of road into a plurality of route links, respectively included in one of the map units, so as to attach the road attribute indicating the first type of road or the road attribute indicating the second type of road to each route link, checking whether the road attribute attached to each route link indicates the first type of road or the second type of road, specifying a first remarked map unit including each first remarked route link and one or a plurality of map units placed near to the first remarked map unit in cases where the road attribute attached to the first remarked route link indicates the first type of road, specifying a second remarked map unit including each second remarked route link in cases where the road attribute attached to the second remarked route link indicates the second type of road, controlling the data storing means to store data of the first remarked map units and data of the map units placed near to the first remarked map units as the first map data, and controlling the data storing means to store data of the second remarked map units and data of the map units placed near to the second remarked map units as the second map data.

3. A navigation device for vehicle according to claim 2, wherein a second pre-reading process is performed by the road attribute checking means to specify one or a plurality of additional map units placed near to the map units which are placed near to the first remarked map unit or the second remarked map unit, and the data storing means is controlled by the road attribute checking means to additionally store data of the additional map units.

4. A navigation device for vehicle according to claim 1, wherein one or a plurality of map units placed near to one second remarked map unit are specified by the road attribute checking means in cases where a junction exists in the second remarked map unit, and the data storing means is controlled by the road attribute checking means to additionally store data of the map units placed near to the second remarked map unit as the second map data.

5. A navigation device for vehicle according to claim 1, wherein the map data providing means is formed of a communication unit, connected with an internet, for downloading the map data from an external server and providing the map data for the pre-reading process means and the data storing means.

6. A navigation device comprising:

a disk unit for reading data from a recording medium, the data including map data;

a data buffer for storing the data read from the recording medium;

a vehicle position detecting unit for determining a current position of a vehicle by receiving inputs including global positioning information;

a route determining unit for determining a driving route from the current position of the vehicle to a destination, the destination being inputted by a user; and an information processing unit for outputting driving information based on the determined driving route, wherein the driving route has a first road type and a second road type and is divided into ranges, each range receiving an attribute depending on a classification of the road type within the range, and wherein the amount of map data stored in the data buffer is dependent on the attribute associated with each range of the driving route.

7. The navigation device according to claim 6, wherein upon completion of storing the map data, which is dependent on the attribute, in the data buffer, additional data other than map data is stored in a free area of the data buffer.

8. The navigation device according to claim 6, wherein, depending on the attribute of the range, map data for adjacent ranges is stored in the data buffer.

9. The device of claim 6, wherein the amount of map data stored in the data buffer is dependent on the attribute associated with each range of the driving route to reduce the amount of stored map data in the data buffer allowing functions other than navigation functions to be performed using at least one other recording medium.

10. A method of determining a route for a vehicle in a navigation device, said method comprising the steps of:

determining a current vehicle position;

receiving, as an input, a destination;

determining a driving route from the current vehicle position to the destination;

storing map data, which is associated with the driving route, in a data buffer; and outputting driving information based on the determined driving route, wherein the driving route has a first road type and a second road type and is divided into ranges, each range receiving an attribute depending on a classification of the road type within the range, wherein the first road type denotes a general road other than a throughway, and the second road type denotes a throughway, and wherein the amount of map data stored in the data buffer is dependent on the attribute associated with each range of the driving route.

11. A method for operating a navigation device to provide a route from a current position to a destination, said method comprising the steps of:

mounting a map recording medium to a disk unit to read map data of a map area that includes the current position and the destination, wherein the map area includes the route having a plurality of different road types, wherein the plurality of different road types include at least a first road type denoting a general road other than a throughway, and a second road type denoting a throughway;

reading the map data to a data buffer by a control unit by determining a road type of the plurality of different road types for a route link of the route according to a road attribute attached to the route link;

storing the map data according to the road type;

mounting another recording medium to the disk unit; and performing navigation operations using the map data stored within the data buffer.

12. The method of claim 11, wherein said mounting another recording medium includes removing the map recording medium from the disk unit.

* * * * *